(12) United States Patent
Ishikawa

(10) Patent No.: US 12,476,273 B2
(45) Date of Patent: Nov. 18, 2025

(54) ELECTRODE BODY-STACKING APPARATUS AND ELECTRODE BODY PRODUCTION LINE

(71) Applicant: HONDA MOTOR CO., LTD., Tokyo (JP)

(72) Inventor: Shota Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/591,108

(22) Filed: Feb. 29, 2024

(65) Prior Publication Data

US 2024/0332599 A1    Oct. 3, 2024

(30) Foreign Application Priority Data

Mar. 31, 2023   (JP) .................................. 2023-058565

(51) Int. Cl.
*H01M 10/04* (2006.01)
*B65G 57/00* (2006.01)

(52) U.S. Cl.
CPC ... *H01M 10/0481* (2013.01); *H01M 10/0404* (2013.01); *B65G 57/005* (2013.01)

(58) Field of Classification Search
CPC .................................................. H01M 10/0404
USPC ............................................ 29/623.1–623.5
See application file for complete search history.

(56) References Cited

U.S. PATENT DOCUMENTS

| | | | | |
|---|---|---|---|---|
| 10,153,520 | B2* | 12/2018 | Iwano | H01M 50/548 |
| 10,497,983 | B2* | 12/2019 | Nam | H01M 10/0459 |
| 2014/0109396 | A1 | 4/2014 | Hirai et al. | |
| 2017/0352923 | A1 | 12/2017 | Iwano et al. | |
| 2020/0144089 | A1* | 5/2020 | Jung | H01M 10/0585 |
| 2021/0257653 | A1 | 8/2021 | Ono et al. | |
| 2024/0332590 | A1* | 10/2024 | Ishikawa | H01M 10/0404 |

FOREIGN PATENT DOCUMENTS

| | | |
|---|---|---|
| JP | 2012-091372 | 5/2012 |
| JP | 2017-220447 | 12/2017 |
| JP | 2019-197652 | 11/2019 |
| JP | 6888704 | 6/2021 |
| WO | 2013/125219 | 8/2013 |

OTHER PUBLICATIONS

Japanese Notice Of Allowance for Japanese Patent Application No. 2023-058565 mailed Dec. 24, 2024.

* cited by examiner

*Primary Examiner* — Lynn E Schwenning
(74) *Attorney, Agent, or Firm* — Amin, Turocy & Watson, LLP

(57) ABSTRACT

A stacking apparatus which is to be disposed downstream of a conveyer that conveys a plurality of electrode bodies and stacks the electrode bodies, the stacking apparatus comprising: a mounting plate disposed obliquely with respect to the electrode bodies conveyed by the conveyer, and on which the electrode bodies are stacked; a first wall section that is erected on the mounting plate and extends along the conveyance direction of the electrode bodies; and an insulating section forming means for forming an insulating section composed of an insulating material on side surfaces of the electrode bodies stacked on the mounting plate.

6 Claims, 4 Drawing Sheets

ELECTRODE BODY-STACKING APPARATUS AND ELECTRODE BODY PRODUCTION LINE

CROSS-REFERENCE TO RELATED APPLICATION

Priority is claimed on Japanese Patent Application No. 2023-058565, filed Mar. 31, 2023, the content of which is incorporated herein by reference.

BACKGROUND OF THE INVENTION

Field of the Invention

The present invention relates to an electrode body-stacking apparatus and an electrode body production line.

Description of Related Art

In recent years, research and development has been conducted on secondary batteries that contribute to energy efficiency, in order to ensure that more people have access to affordable, reliable, sustainable, and advanced energy.

Laminate cells and stacked prismatic cells, which are used as secondary batteries, have a structure in which a plurality of electrode bodies are stacked and housed in a laminate film or a cell can. Therefore, the process of manufacturing these battery cells includes the process of stacking a plurality of electrode bodies.

For example, International Patent Application Publication No. 2013/125219 discloses a technique for stacking a positive electrode sheet, a negative electrode sheet, a separator, etc. by the operation of a rotating unit having an arm.

SUMMARY OF THE INVENTION

However, in the conventional technique described above, the arms grasp and stack the objects one by one, so that it may take time to complete the stacking, and therefore there is room for improvement. Further, an insulating section composed of an insulating material needs to be formed on the side surfaces of stacked electrode bodies via a separate process, so that it takes additional time to complete the formation of the insulating section. Therefore, there is room for improvement.

The present invention provides a stacking apparatus and a production line that shorten the time required for stacking a plurality of electrode bodies and also shorten the time required to form an insulating section composed of an insulating material on the side surfaces of the stacked electrode bodies. This in turn contributes to energy efficiency.

The embodiments of the present invention have the following configurations.

[1] A stacking apparatus which is to be disposed downstream of a conveyer that conveys a plurality of electrode bodies and stacks the electrode bodies, the stacking apparatus comprising:
  a mounting plate disposed obliquely with respect to a conveyance direction in which the electrode bodies are conveyed by the conveyer, and on which the electrode bodies are stacked;
  a first wall section that is erected on the mounting plate and extends along the conveyance direction of the electrode bodies; and
  an insulating section forming means for forming an insulating section composed of an insulating material on side surfaces of the electrode bodies stacked on the mounting plate.

The stacking apparatus of the present invention can implement stacking utilizing the movement of the electrode bodies themselves that are being conveyed, and can thereby shorten the time required to complete the stacking. Further, the stacking apparatus of the present invention can form the insulating section composed of an insulating material on the side surfaces of the electrode bodies while the electrode bodies remain stacked on the mounting plate; therefore, the time required to form the insulating section can be shortened.

[2] The stacking apparatus according to [1], wherein the insulating section forming means comprises: an unwinding means for unwinding a film coated with an insulating material along the side surfaces of the electrode bodies; and a winding means for winding up the film after transferring the insulating material onto the side surfaces of the electrode bodies.

The stacking apparatus of the present invention can form the insulating section composed of an insulating material on the side surfaces of the electrode bodies while the electrode bodies remain stacked on the mounting plate; therefore, the time required to form the insulating section can be shortened.

[3] The stacking apparatus according to [1], which further comprises a curing means for curing the insulating material.

The stacking apparatus of the present invention can cure the insulating material applied to the side surfaces of the electrode bodies within a short period of time, while the electrode bodies remain stacked on the mounting plate; therefore, the time required to form the insulating section can be shortened.

[4] The stacking apparatus according to [1], wherein each of the electrode bodies comprises a first negative electrode layer, a first solid electrolyte layer, a positive electrode layer, a second solid electrolyte layer, and a second negative electrode layer, wherein each of the electrode bodies has a current collector that is formed of copper at its end portion in a stacking direction of the first negative electrode layer, the positive electrode layer and the second negative electrode layer.

Since the electrode bodies include a solid electrolyte layer rather than a liquid or gel electrolyte, the stacking apparatus of the present invention can decrease the possibility of the electrode bodies being damaged in collision with the first wall section and the second wall section.

[5] An electrode body production line that conveys and stacks a plurality of electrode bodies, comprising:
  a conveyer that conveys the electrode bodies; and
  a plurality of the stacking apparatuses according to any one of [1] to [4],
  wherein the electrode body production line is configured to switch the stacking apparatuses such that, when a predetermined number of the electrode bodies are stacked on one of the stacking apparatuses, the electrode bodies are stacked on another one the lamination apparatuses.

The electrode body production line of the present invention can stack electrode bodies successively, and can thereby shorten the time required to complete the stacking.

The embodiment of the present invention can shorten the time required for stacking a plurality of electrode bodies and also shorten the time required to form an insulating section composed of an insulating material on the side surfaces of the stacked electrode bodies.

DETAILED DESCRIPTION OF THE INVENTION

Hereinbelow, the embodiments of the present invention are described in detail, referring to the annexed drawings.

[Electrode Body Production Line and Stacking Apparatus]

Figure 1:
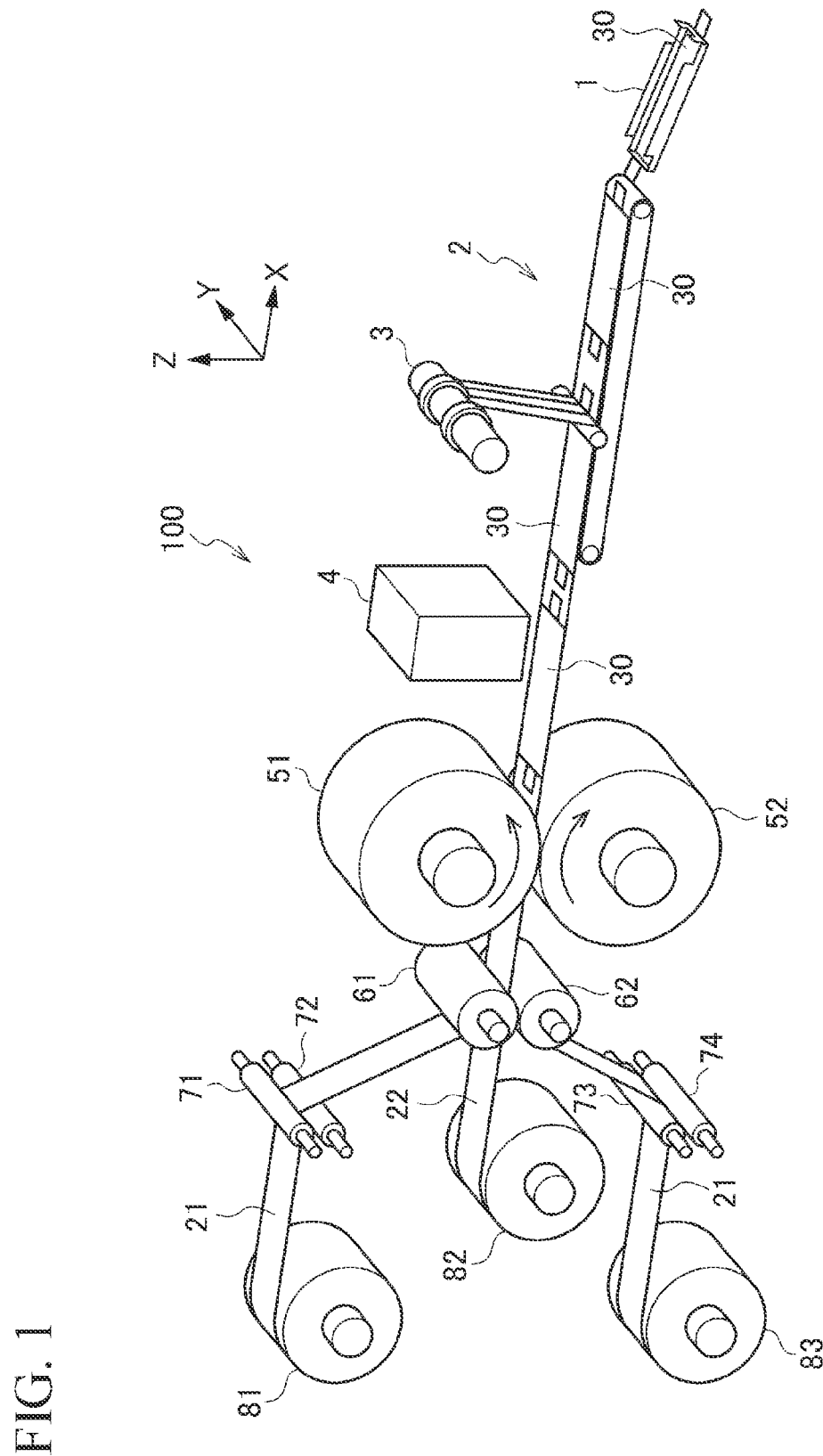
FIG. 1 is a schematic view showing an electrode body production line according to an embodiment of the present invention.

FIG. 1 is a schematic view showing an electrode body production line according to an embodiment of the present invention.

As shown in FIG. 1, the production line 100 of the present embodiment includes a conveyer 2 that conveys a plurality of electrode bodies 30, and a stacking apparatus (stocker) 1 that is disposed downstream of the conveyer 2 and stacks a plurality of electrode bodies 30.

The conveyer 2 is provided with electrode rolls 81 and 83 around which the negative electrode members 21 are wound, and an electrode roll 82 around which the positive electrode member 22 is wound. The positive electrode member 22 includes a current collector foil and a positive electrode active material coated on the current collector foil. The negative electrode member 21 includes a current collector foil and a negative electrode active material coated on the current collector foil. The battery cell in the present embodiment is a solid-state battery, wherein the positive electrode member 22 (positive electrode layer) is interposed between a pair of negative electrode members 21 (negative electrode layers). A solid electrolyte layer is interposed between the positive electrode member (positive electrode layer) and the negative electrode member (negative electrode layer). The production line 100, the solid electrolyte layer may be provided on both sides of the positive electrode member 22, or may be provided on one side of the negative electrode member 21. In the present specification, the structure in which the positive electrode member 22 is interposed between the negative electrode members 21 is referred to as an electrode body 30.

In one preferred embodiment of the present invention, the current collector is formed of copper at its end portion in a stacking direction of the pair of negative electrode member 21 (negative electrode layer) and the positive electrode member 22 (positive electrode layer).

Figure 3:
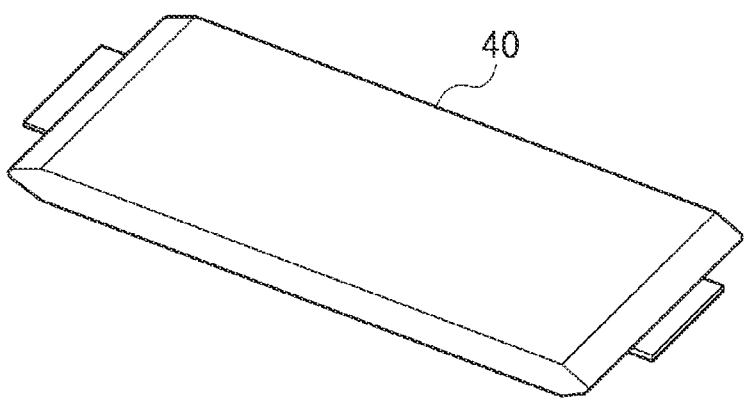
FIG. 3 is a perspective view showing a laminate cell produced with the electrode body production line according to an embodiment of the present invention.

In a later step, the electrode bodies 30 are provided with tab leads that are joined to the current collector foils of the positive and negative electrodes, respectively, and are covered with a laminate film with the tab leads exposed. FIG. 3 is a perspective view showing a laminate cell 40 using the electrode bodies 30 produced on the production line 100.

The conveyance direction of the electrode bodies 30 in the present embodiment coincides with the longitudinal direction of the electrode bodies 30. The electrode member 21 of the negative electrode roll 81 is guided by roll devices 71 and 72, and is laminated on other electrode members by roll devices 61 and 62. The positive electrode roll 82 is guided by the roll devices 61 and 62 and laminated on other electrode members. The electrode member 21 of the negative electrode roll 83 is guided by roll devices 73 and 74, and is laminated on other electrode members by the roll devices 61 and 62.

The three electrode members laminated together by the roll devices 61 and 62 are integrated under pressure from above and below by the roll presses 51 and 52. Next, the laser cutter 4 installed above the conveyance path emits a laser beam to notch the remnant edge sections on the outer periphery of the integrated electrode body 30. For example, when the electrode body 30 is transferred to the conveyer 2, which is a belt conveyer, the notched remnant edge sections are wound up by the remnant material winding device 3.

The conveyer 2 conveys the electrode body 30 at a predetermined speed (for example, 100 m/min). The electrode body 30 that has been conveyed to the end of the conveyer 2 is ejected from the conveyer 2 due to inertia and falls onto the stocker 1. In the stocker 1, the electrode bodies 30 sent from the conveyer 2 are stacked one upon another. The stocker 1 is disposed at a position downstream of the conveyer 2 and close to the conveyer 2 (that is, at a position where the electrode body 30 sent from the conveyer 2 can be received).

Further, the production line 100 of the present embodiment may include a plurality of the stockers 1, and may be configured to switch the stockers 1 such that, when a predetermined number of the electrode bodies 30 are stacked on one of the stockers 1, the electrode bodies 30 are stacked on another one the stockers 1.

Figure 2:
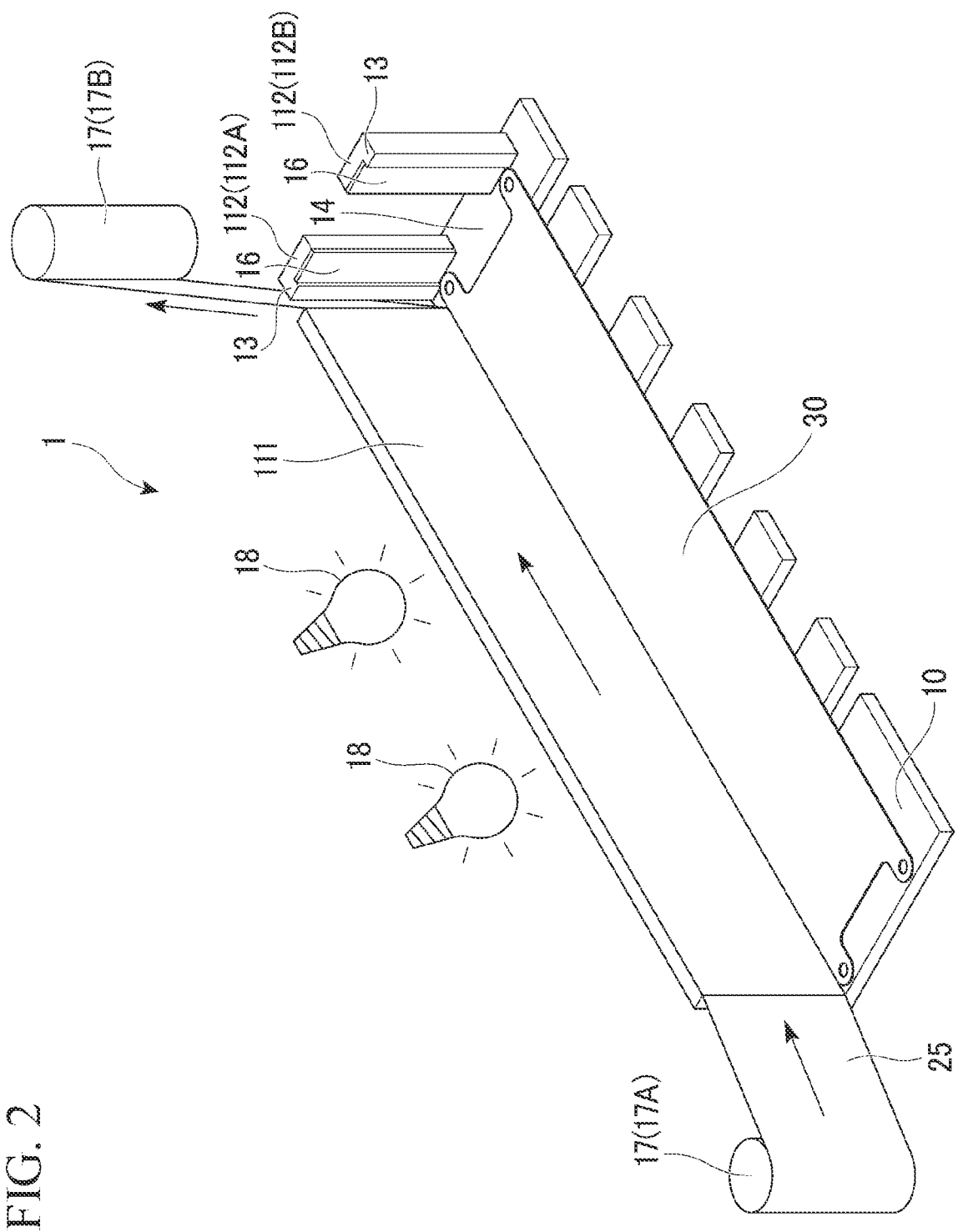
FIG. 2 is a perspective view showing a stacking apparatus (stocker) according to an embodiment of the present invention.

FIG. 2 is a perspective view showing a stacking apparatus (stocker) according to an embodiment of the present invention. The stocker 1 includes a mounting plate 10 on which a plurality of electrode bodies 30 are to be stacked. The mounting plate 10 has a first wall section 111 and a second wall section 112. The first wall section 111 is erected on the mounting plate 10 along the conveyance direction. The second wall section 112 intersects with the first wall section 111 and is erected on the mounting plate 10 at one end side of the first wall section 111 in the conveyance direction. The second wall section 112 has a pair of wall sections 112A and 112B extending orthogonally to the conveyance direction. The wall sections 112A and 112B are spaced apart from each other and are arranged to face each other across the conveyance path of the electrode bodies 30 on the mounting plate 10. The electrode bodies 30 stacked in alignment on the mounting plate 10 by the first wall section 111 and the second wall section 112 (that is, the electrode bodies 30 are arranged without displacement as viewed in the stacking direction).

The first wall section 111 is a surface facing the conveyer 2 in the Y-axis direction, which is a direction perpendicular to the conveyance direction.

The second wall section 112 is a surface facing the conveyer 2 in the X-axis direction, which is the conveyance direction of the electrode bodies 30, and has a fall prevention section 13 that prevents the electrode bodies 30 from falling from the mounting plate 10. In the second wall section 112, an opening 14 is provided in the fall prevention section 13 at the center in the Y-axis direction. In the Y-axis direction perpendicular to the conveyance direction, the width of the opening 14 is larger than the width of the current collector foil extending from the electrode body 30. Therefore, even when the electrode body 30 reaches the second wall section 112 (that is, the fall prevention section 13), the current collector foil is accommodated in the opening 14, so that the second wall section 112 does not interfere with the current collector foil.

The mounting plate 10 of the stocker 1 is inclined downward as it goes from the upstream side to the downstream side in the conveyance direction (X-axis direction), that is, as a distance from the conveyer 2 increases. Therefore, the electrode body 30 conveyed to the stocker 1 moves downward toward the second wall section 112, comes into contact with the second wall section 112 (fall prevention portion 13), and stops. Further, the mounting plate 10 of the stocker 1 is inclined downward toward the first wall section 111 in the direction (Y-axis direction) perpendicular to the conveyance direction. Therefore, the electrode body 30 conveyed to the stocker 1 moves downward toward the first wall section 111, comes into contact with the first wall section 111, and stops.

The mounting plate 10 preferably has an inclination angle of 10° or more and 25° or less, more preferably 20° or more and 25° or less with respect to the conveyance direction (X-axis direction) of the electrode body 30. Further, the mounting plate 10 preferably has an inclination angle of 10° or more and 20° or less, more preferably 15° or more and 20° or less with respect to the direction (Y-axis direction) perpendicular to the conveyance direction of the electrode body 30. As long as the inclination angles of the mounting plate 10 with respect to the X-axis direction and the Y-axis direction are within the above ranges, the electrode bodies 30 can be stacked in alignment even without a mechanism for alignment.

As a result, the electrode bodies 30 that are successively conveyed from the conveyer 2 are stacked in contact with the first wall section 111 and the second wall section 112 (fall prevention section 13), and can be aligned without a mechanism for alignment.

The second wall section 112 may include a cushioning member 16 on the surface that contacts the electrode bodies 30. The cushioning member 16 can suppress the impact when the electrode bodies 30 collide with the second wall section 112, so that damage to the electrode bodies 30 can be suppressed.

As described above, the stacking apparatus 1 of the present embodiment can stack the electrode bodies 30 utilizing the movement (e.g., falling) of the electrode bodies 30 themselves, so that the time required to complete the stacking can be shortened.

Further, the stocker 1 has an insulating section forming means 17 for forming an insulating section composed of an insulating material on side surfaces of the electrode bodies 30 stacked on the mounting plate 10. The insulating section forming means 17 comprises: an unwinding means 17A for unwinding a film 25 coated with an insulating material along the side surfaces of the electrode bodies 30; and a winding means 17B for winding up the film 25 after transferring the insulating material onto the side surfaces of the electrode bodies 30.

Examples of insulating materials include ultraviolet curable resins.

The stocker 1 further comprises a curing means 18 for curing the insulating material. Examples of the curing means 18 include an ultraviolet lamp that emits light of a wavelength that cures the insulating material.

Hereinbelow, a method for applying an insulating material to the side surfaces of the electrode bodies 30 stacked on the mounting plate 10 using the stocker 1 of the present embodiment is described.

Figure 4:
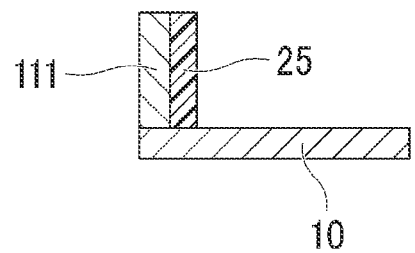
FIG. 4 is a cross-sectional view showing a method for forming an insulating section by a stacking apparatus according to an embodiment of the present invention.

As shown in FIG. 4, the film 25 coated with an insulating material is unwound from the unwinding means 17A along the first wall section 111 before the electrode bodies 30 are stacked thereon. In this process, the surface of the film 25 coated with the insulating material is placed on the opposite side from the first wall section 111.

Figure 5:
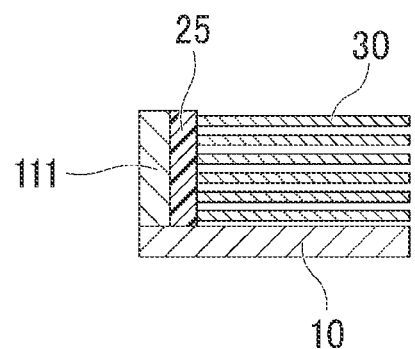
FIG. 5 is a cross-sectional view showing a method for forming an insulating section by a stacking apparatus according to an embodiment of the present invention.

Next, as shown in FIG. 5, a plurality of electrode bodies 30 are stacked on the mounting plate 10 as described above.

Figure 6:
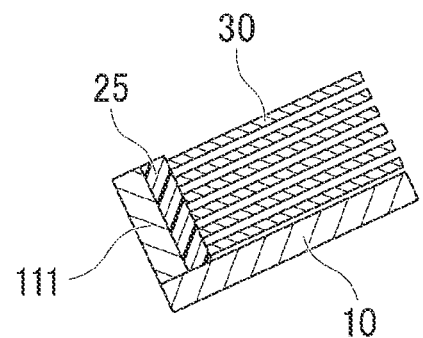
FIG. 6 is a cross-sectional view showing a method for forming an insulating section by a stacking apparatus according to an embodiment of the present invention.

Then, as shown in FIG. 6, the mounting plate 10 is inclined in the Y-axis direction perpendicular to the conveyance direction, and the electrode bodies 30 are brought into contact with the insulating material-coated surface of the film 25. As a result, the insulating material is transferred to the side surfaces of the electrode bodies 30.

Then, the curing means 18 irradiates the insulating material on the side surfaces of the electrode bodies 30 with ultraviolet rays to cure the insulating material, thereby forming an insulating section on the side surfaces of the electrode bodies 30.

Figure 7:
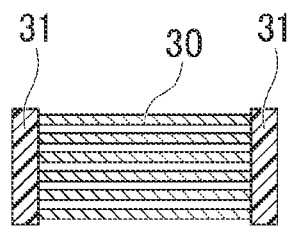
FIG. 7 is a cross-sectional view showing a method for forming an insulating section by a stacking apparatus according to an embodiment of the present invention.

Similar operations are repeated to form insulating sections 31, 31 on the side surfaces of the electrode bodies 30, as shown in FIG. 7.

As described above, the stacking apparatus 1 of the present embodiment can form the insulating section 31 composed of an insulating material on the side surfaces of the electrode bodies 30 while the electrode bodies 30 remain stacked on the mounting plate 10; therefore, the time required to form the insulating section 31 can be shortened.

Further, the process after stacking the electrode bodies 30 includes a process such as lamination. When the electrode bodies 30 are stacked with misalignment, subsequent steps cannot be carried out; therefore, it is important to align the electrode bodies 30 without misalignment. In the stacking apparatus 1 of the present embodiment, the mounting plate 10 is inclined downward from the upstream side to the downstream side in the conveyance direction, and is inclined downward toward the first wall section 111 in the direction perpendicular to the conveyance direction. Therefore, the electrode body 30 conveyed to the stocker 1 moves downward toward the first wall section 111 and the second wall section 112, comes into contact with the first wall section 111 and the second wall section 112, and stops.

Although various embodiments are described above with reference to the drawings, it goes without saying that the present invention is not limited to such examples. It is clear that those skilled in the art can conceive various alterations and modifications within the scope of the claims, which are naturally understood to fall within the technical scope of the present invention. Further, the constituent elements in the above embodiments may be combined in any manner as long as such combinations do not deviate from the essence of the present invention.

What is claimed is:

1. A stacking apparatus which is to be disposed downstream of a conveyer that conveys a plurality of electrode bodies and stacks the electrode bodies, the stacking apparatus comprising:
    a mounting plate disposed obliquely with respect to a conveyance direction in which the electrode bodies are conveyed by the conveyer, and on which the electrode bodies are stacked;
    a first wall section that is erected on the mounting plate and extends along the conveyance direction of the electrode bodies; and
    an insulating section forming means for forming an insulating section composed of an insulating material on side surfaces of the electrode bodies stacked on the mounting plate,
    wherein the insulating section forming means comprises:
        an unwinding means for unwinding a film coated with an insulating material along the side surfaces of the electrode bodies; and
        a winding means for winding up the film after transferring the insulating material onto the side surfaces of the electrode bodies.

2. The stacking apparatus according to claim 1, which further comprises a curing means for curing the insulating material.

3. An electrode body production line that conveys and stacks a plurality of electrode bodies, comprising:
    a conveyer that conveys the electrode bodies; and
    a plurality of the stacking apparatuses according to claim 2,
    wherein the electrode body production line is configured to switch the stacking apparatuses such that, when a predetermined number of the electrode bodies are stacked on one of the stacking apparatuses, the electrode bodies are stacked on another one the lamination apparatuses.

4. The stacking apparatus according to claim 1, wherein each of the electrode bodies comprises a first negative electrode layer, a first solid electrolyte layer, a positive electrode layer, a second solid electrolyte layer, and a second negative electrode layer,
    wherein each of the electrode bodies has a current collector that is formed of copper at its end portion in a stacking direction of the first negative electrode layer, the positive electrode layer and the second negative electrode layer.

5. An electrode body production line that conveys and stacks a plurality of electrode bodies, comprising:
    a conveyer that conveys the electrode bodies; and
    a plurality of the stacking apparatuses according to claim 4,
    wherein the electrode body production line is configured to switch the stacking apparatuses such that, when a predetermined number of the electrode bodies are stacked on one of the stacking apparatuses, the electrode bodies are stacked on another one the lamination apparatuses.

6. An electrode body production line that conveys and stacks a plurality of electrode bodies, comprising:
    a conveyer that conveys the electrode bodies; and
    a plurality of the stacking apparatuses according to claim 1,
    wherein the electrode body production line is configured to switch the stacking apparatuses such that, when a predetermined number of the electrode bodies are stacked on one of the stacking apparatuses, the electrode bodies are stacked on another one the lamination apparatuses.

* * * * *